(12) United States Patent
Terao et al.

(10) Patent No.: US 10,642,533 B2
(45) Date of Patent: May 5, 2020

(54) INFORMATION PROCESSING DEVICE, INFORMATION RECORDING MEDIUM, INFORMATION PROCESSING METHOD, AND PROGRAM

(71) Applicant: SONY CORPORATION, Tokyo (JP)

(72) Inventors: Motohiro Terao, Tokyo (JP); Takashi Nagatomo, Kanagawa (JP); Hideki Ando, Tokyo (JP)

(73) Assignee: SONY CORPORATION, Tokyo (JP)

( * ) Notice: Subject to any disclaimer, the term of this patent is extended or adjusted under 35 U.S.C. 154(b) by 225 days.

(21) Appl. No.: 15/537,627

(22) PCT Filed: Mar. 2, 2016

(86) PCT No.: PCT/JP2016/056351
§ 371 (c)(1),
(2) Date: Jun. 19, 2017

(87) PCT Pub. No.: WO2016/152413
PCT Pub. Date: Sep. 29, 2016

(65) Prior Publication Data
US 2018/0032284 A1    Feb. 1, 2018

(30) Foreign Application Priority Data

Mar. 23, 2015    (JP) ................... 2015-059083

(51) Int. Cl.
*G06F 3/06*    (2006.01)
*G11B 20/12*    (2006.01)
(Continued)

(52) U.S. Cl.
CPC .......... *G06F 3/0659* (2013.01); *G06F 3/0604* (2013.01); *G06F 3/0677* (2013.01);
(Continued)

(58) Field of Classification Search
None
See application file for complete search history.

(56) References Cited

U.S. PATENT DOCUMENTS 5,406,534 A * 4/1995 Hisakado ............. G11B 7/0045
369/44.37

FOREIGN PATENT DOCUMENTS

| JP | 2008-146831 | 6/2008 |
|----|-------------|--------|
| JP | 2010-165451 | 7/2010 |

(Continued)

*Primary Examiner* — Michael Alsip
(74) *Attorney, Agent, or Firm* — Paratus Law Group, PLLC

(57) ABSTRACT

A configuration for reducing a possibility of data recording or reproduction being unperformable due to a reading error of disc management information is realized. A data processing unit records management information corresponding to a first surface as main management information on the first surface which is a data recording surface on which data recording is performed and further records mirror management information having the same content as the main management information on a second surface different from the first surface. The management information is, for example, a temporary disc management structure (TDMS) including defect region information of one surface of a disc. When one piece of management information between the main management information and the mirror management information is successfully read, data recording or reproduction can be correctly performed.

21 Claims, 15 Drawing Sheets

(51) Int. Cl.
   *G11B 20/18*   (2006.01)
   *G11B 27/32*   (2006.01)
   *G11B 20/10*   (2006.01)
   *G11B 7/24*    (2013.01)
   *G11B 7/24038*     (2013.01)

(52) U.S. Cl.
   CPC ............. *G11B 7/24* (2013.01); *G11B 20/10* (2013.01); *G11B 20/1217* (2013.01); *G11B 20/1889* (2013.01); *G11B 27/329* (2013.01); *G11B 7/24038* (2013.01); *G11B 2220/215* (2013.01)

(56) References Cited

FOREIGN PATENT DOCUMENTS

| | | |
|---|---|---|
| JP | 2011-233230 | 11/2011 |
| JP | 2013-054792 | 3/2013 |
| JP | 2013-218782 | 10/2013 |
| WO | WO 2012/108178 | 8/2012 |

\* cited by examiner

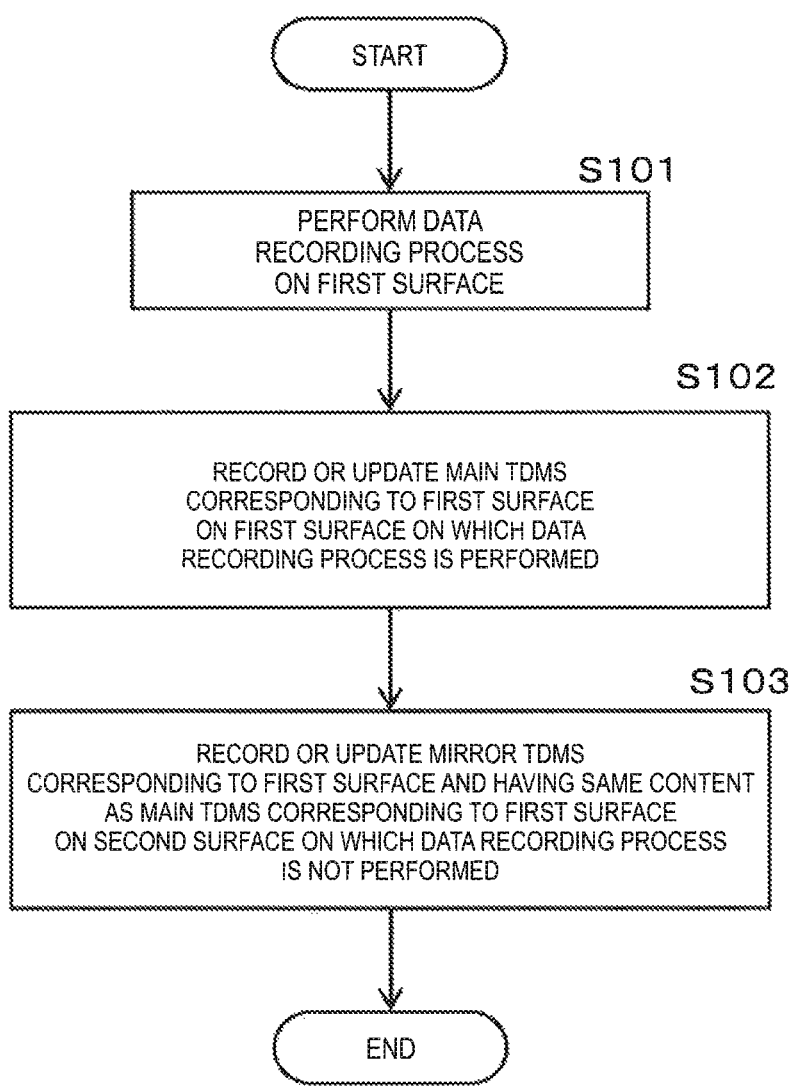

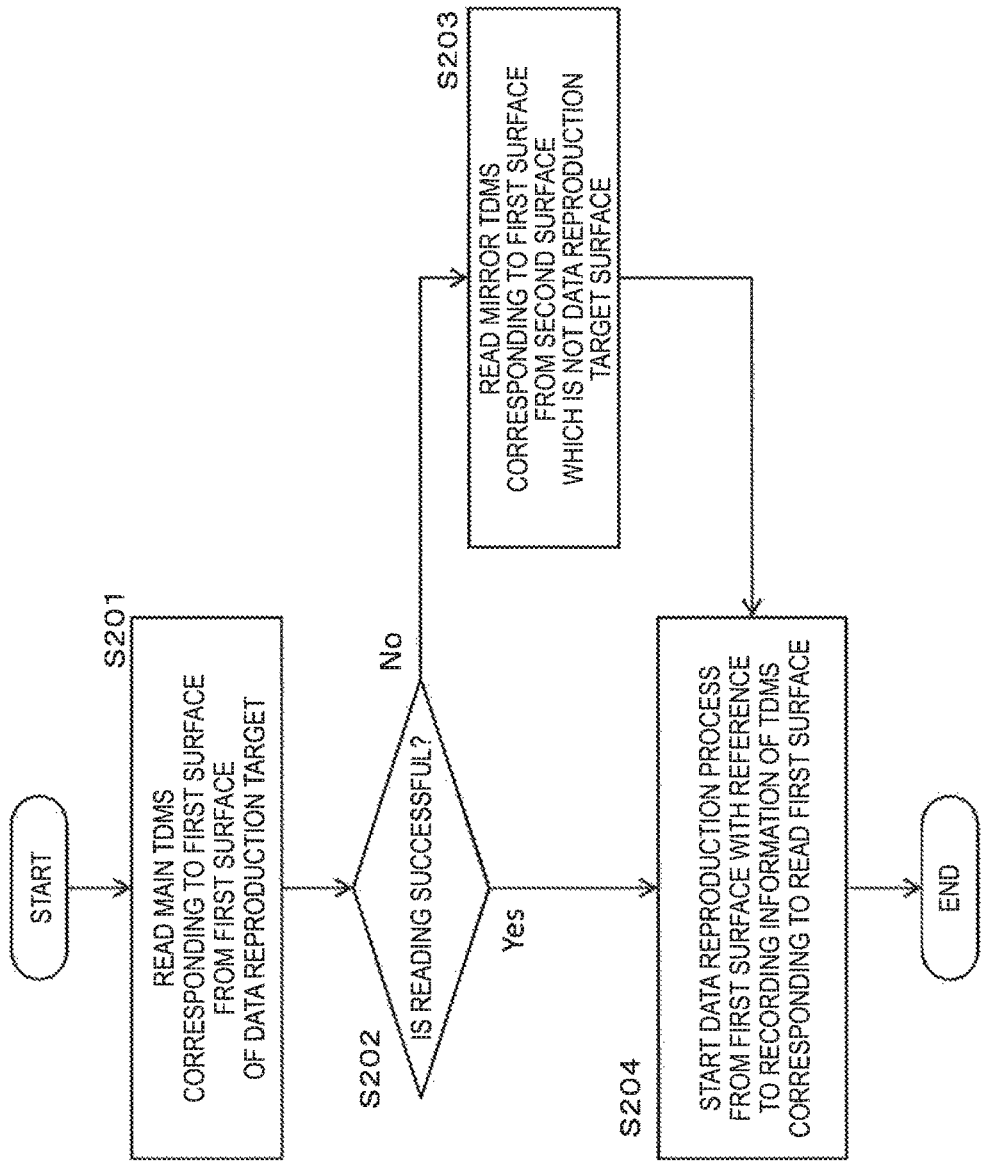

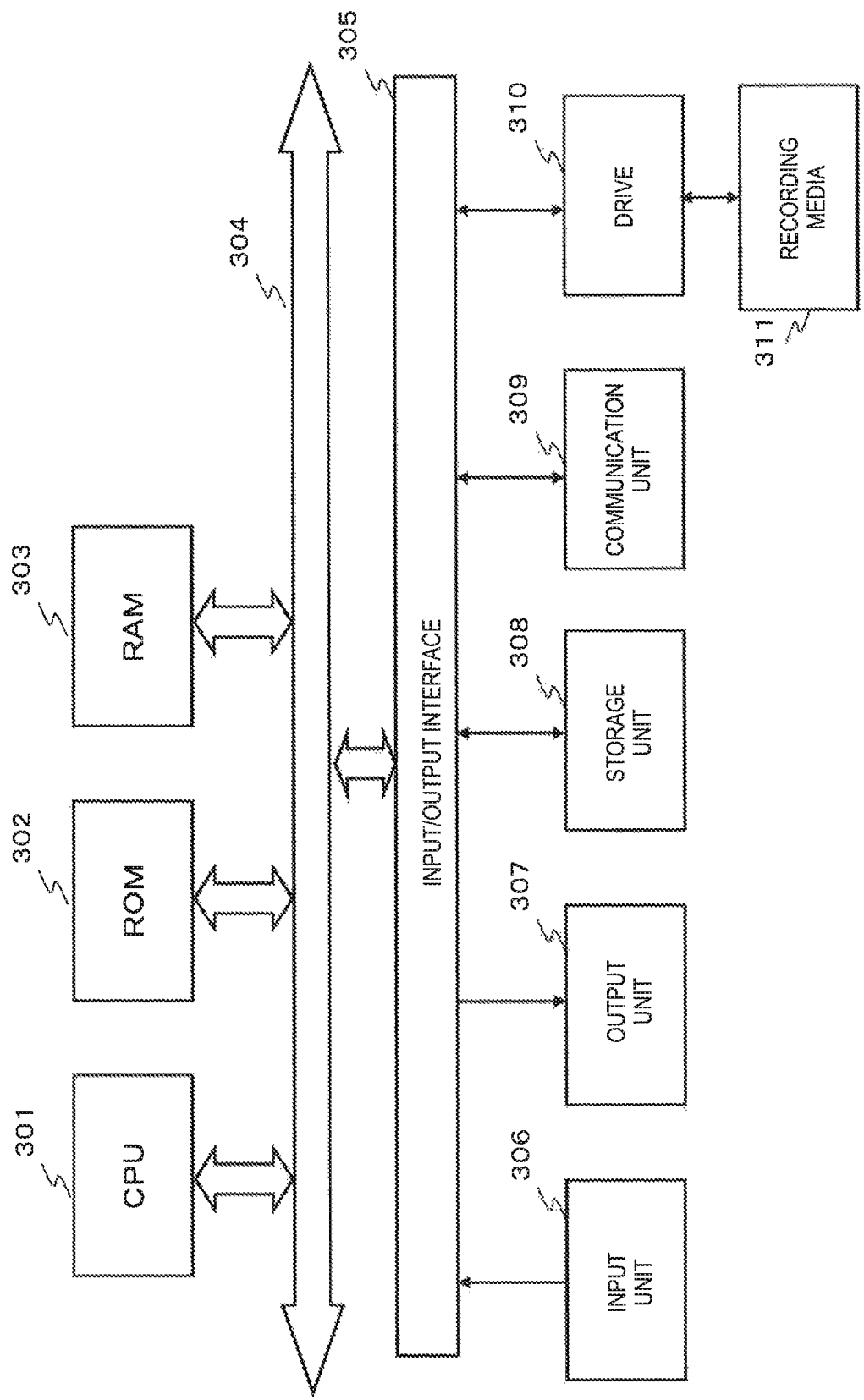

INFORMATION PROCESSING DEVICE, INFORMATION RECORDING MEDIUM, INFORMATION PROCESSING METHOD, AND PROGRAM

CROSS REFERENCE TO PRIOR APPLICATION

This application is a National Stage Patent Application of PCT International Patent Application No. PCT/JP2016/056351 (filed on Mar. 2, 2016) under 35 U.S.C. § 371, which claims priority to Japanese Patent Application No. 2015-059083 (filed on Mar. 23, 2015), which are all hereby incorporated by reference in their entirety.

TECHNICAL FIELD

The present disclosure relates to an information processing device, an information processing method, and a program, and more particularly, to an information processing device, an information processing medium, an information processing method, and a program capable of more reliably reading disc management information such as defect region information or the like on a double-sided recording disc, specifically, for example, disc management information such as a temporary disc management structure (TDMS).

BACKGROUND ART

As recording media on which various kinds of data are recorded, optical discs such as digital versatile discs (DVDs) or Blu-ray (registered trademark) discs (BDs) are used often.

As such optical discs, not only single-sided discs in which data is recorded only on a front surface but also double-sided discs in which data is recorded on both front and rear surfaces are considerably used.

In addition, for example, a data recording process on a BD is performed in units of clusters of 64 KB. However, defect clusters in which data recording or reading may not be performed due to various causes occur in some cases.

When a data recording process or a reproduction process is performed, such defect cluster regions are necessarily skipped for the processes. Data to be recorded in defect clusters is subjected to a process or the like in which alternative clusters are used. When such a cluster skipping process or an alternative cluster using process is performed, it is necessary to acquire defect cluster information.

Management information including the defect cluster information is recorded in, for example, a temporary disc management area (TDMA) set in an inner zone or an outer zone of a disc.

In the TDMA, for example, a temporary disc management structure (TDMS) including latest defect cluster information is additionally recorded as necessary whenever new data is recorded on a disc.

When data is subjected to a postscript process or a reproduction process, a latest TDMS is read, a defect cluster position is determined, and a recording or reproduction process is performed.

Also, the TDMA or the TDMS is management data unique to a recordable optical disc.

The TDMA or the TDMS is described in, for example, Patent Literature 1 (JP 2011-233230A).

However, so far, a TDMA has been generally configured to be set and recorded in units of areas of a disc. That is, in the case of a double-sided disc, defect information regarding a disc front surface is recorded in a TDMA of the front surface and defect information regarding a disc rear surface is recorded in a TDMA of the disc rear surface.

Accordingly, for example, when a TDMA on a disc front surface is not readable due to any cause, there is a possibility of defect information on the front surface not being obtainable and new data not being correctly recorded or reproduced.

That is, in the related art, a TDMS is not subjected to redundant recording and may be a single point of failure.

CITATION LIST

Patent Literature

Patent Literature 1: JP 2011-233230A

DISCLOSURE OF INVENTION

Technical Problem

The present disclosure is devised in view of the foregoing problem and an object of the present disclosure is to provide an information processing device, an information processing medium, an information processing method, and a program capable of more reliably reading disc management information such as defect region information or the like on a double-sided recording disc, specifically, for example, disc management information such as a temporary disc management structure (TDMS).

Solution to Problem

According to a first aspect of the present disclosure, an information processing device includes a data processing unit configured to record management information regarding a disc. The data processing unit records management information corresponding to a first surface as main management information on the first surface which is a data recording surface on which data recording is performed and further performs a process of recording mirror management information having the same content as the main management information on a second surface which is different from the first surface which is a data recording surface on which the data recording is performed.

In addition, according to a second aspect of the present disclosure, an information processing device includes a data processing unit configured to perform a data reproduction process from a disc. The data processing unit performs a process of reading main management information which is management information corresponding to a first surface from the first surface which is a data recording surface serving as a data reproduction target, performs a process of reading mirror management information having the same content as the main management information from a second surface different from the first surface when a reading error of the main management information occurs, and performs the data reproduction process from the first surface with reference to any of the main management information and the mirror management information.

In addition, according to a third aspect of the present disclosure, there is provided a disc type information recording medium on which user data and management information are recorded. The management information is individual management information corresponding to each surface of a disc. First surface management information corresponding to a first surface is recorded as main management information on the first surface. Mirror management information having the same content as the main management information is recorded on a second surface different from the first surface.

In addition, according to a fourth aspect of the present disclosure, there is provided an information processing method of performing data recording control on a disc in an information processing device. The information processing device includes a data processing unit configured to record management information regarding the disc. The data processing unit records management information corresponding to a first surface as main management information on the first surface which is a data recording surface on which data recording is performed and further performs a process of recording mirror management information having the same content as the main management information on a second surface which is different from the first surface which is a data recording surface on which the data recording is performed.

In addition, according to a fifth aspect of the present disclosure, there is provided an information processing method of performing data reproduction control from a disc in an information processing device. The information processing device includes a data processing unit configured to perform a data reproduction process from the disc. The data processing unit performs a process of reading main management information which is management information corresponding to a first surface from the first surface which is a data recording surface serving as a data reproduction target, performs a process of reading mirror management information having the same content as the main management information from a second surface different from the first surface when a reading error of the main management information occurs, and performs the data reproduction process from the first surface with reference to any of the main management information and the mirror management information.

In addition, according to a sixth aspect of the present disclosure, there is provided a program causing data recording control to be performed on a disc in an information processing device. The information processing device includes a data processing unit configured to record management information regarding the disc. The program causes the data processing unit to perform a process of recording management information corresponding to a first surface as main management information on the first surface which is a data recording surface on which data recording is performed and a process of recording mirror management information having the same content as the main management information on a second surface which is different from the first surface which is a data recording surface on which the data recording is performed.

In addition, according to a seventh aspect of the present disclosure, there is provided a program causing data reproduction control from a disc to be performed in an information processing device. The information processing device includes a data processing unit configured to perform the data reproduction process from the disc. The program causes the data processing unit to perform a process of reading main management information which is management information corresponding to a first surface from the first surface which is a data recording surface serving as a data reproduction target, a process of reading mirror management information having the same content as the main management information from a second surface different from the first surface when a reading error of the main management information occurs, and the data reproduction process from the first surface with reference to any of the main management information and the mirror management information.

Note that a program according to the present disclosure is, for example, a program provided in computer-readable format to an information processing device or a computer system capable of executing various program code, the program being providable by a storage medium or communication medium. By providing such a program in a computer-readable format, processing corresponding to the program is realized on the information processing device or the computer system.

Further objectives, features, and advantages of the present disclosure will be clarified by a more detailed description based on the embodiments of the present disclosure described hereinafter and the attached drawings, Note that in this specification, the term "system" refers to a logical aggregate configuration of multiple devices, and the respective devices of the configuration are not limited to being inside the same housing.

Advantageous Effects of Invention

According to a configuration of an embodiment of the present disclosure, a configuration for reducing a possibility of data recording or reproduction being unperformable due to a reading error of disc management information is realized.

Specifically, the data processing unit of an information processing device which performs data recording and reproduction on a disc records management information corresponding to a first surface as main management information on the first surface which is a data recording surface on which data recording is performed and further performs a process of recording mirror management information having the same content as the main management information on a second surface different from the first surface. The management information is, for example, a temporary disc management structure (TDMS) including defect region information of one surface of a disc. When one piece of management information between the main management information and the mirror management information is successfully read, data recording or reproduction can be correctly performed.

In this configuration, it is possible to reduce the possibility of the data recording or reproduction being unperformable due to a reading error of the disc management information.

Note that the advantageous effects described in this specification are merely for the sake of example and non-limiting, and there may be additional advantageous effects.

BRIEF DESCRIPTION OF DRAWINGS

FIG. 13 is a flowchart for describing a process sequence performed by an information processing device.

FIG. 14 is a flowchart for describing a process sequence performed by an information processing device.

FIG. 15 is a diagram for describing an example of a hardware configuration of an information processing device.

MODE(S) FOR CARRYING OUT THE INVENTION

Hereinafter, an information processing device, an information recording medium, an information processing method, and a program according to the present disclosure will he described in detail with reference to the drawings. The description will be made in accordance with the following items,
1. Data recording configuration of optical disc
2. Recording configuration of improved disc management information
3. Detailed configuration and specific recording example of TDMS
3-(A). Configuration in which two TDMSs are recorded in one cluster
3-(B). Configuration in which one TDMS is recorded in one cluster
3-(C). Configuration in which one TDMS is recorded using a plurality of clusters
4. Process sequence performed by information processing device
5. Configuration example of information processing device
5. Summary of configuration of present disclosure

[1. Data Recording Configuration of Optical Disc]

First, a data recording configuration example of an optical disc will be described.

Figure 1:
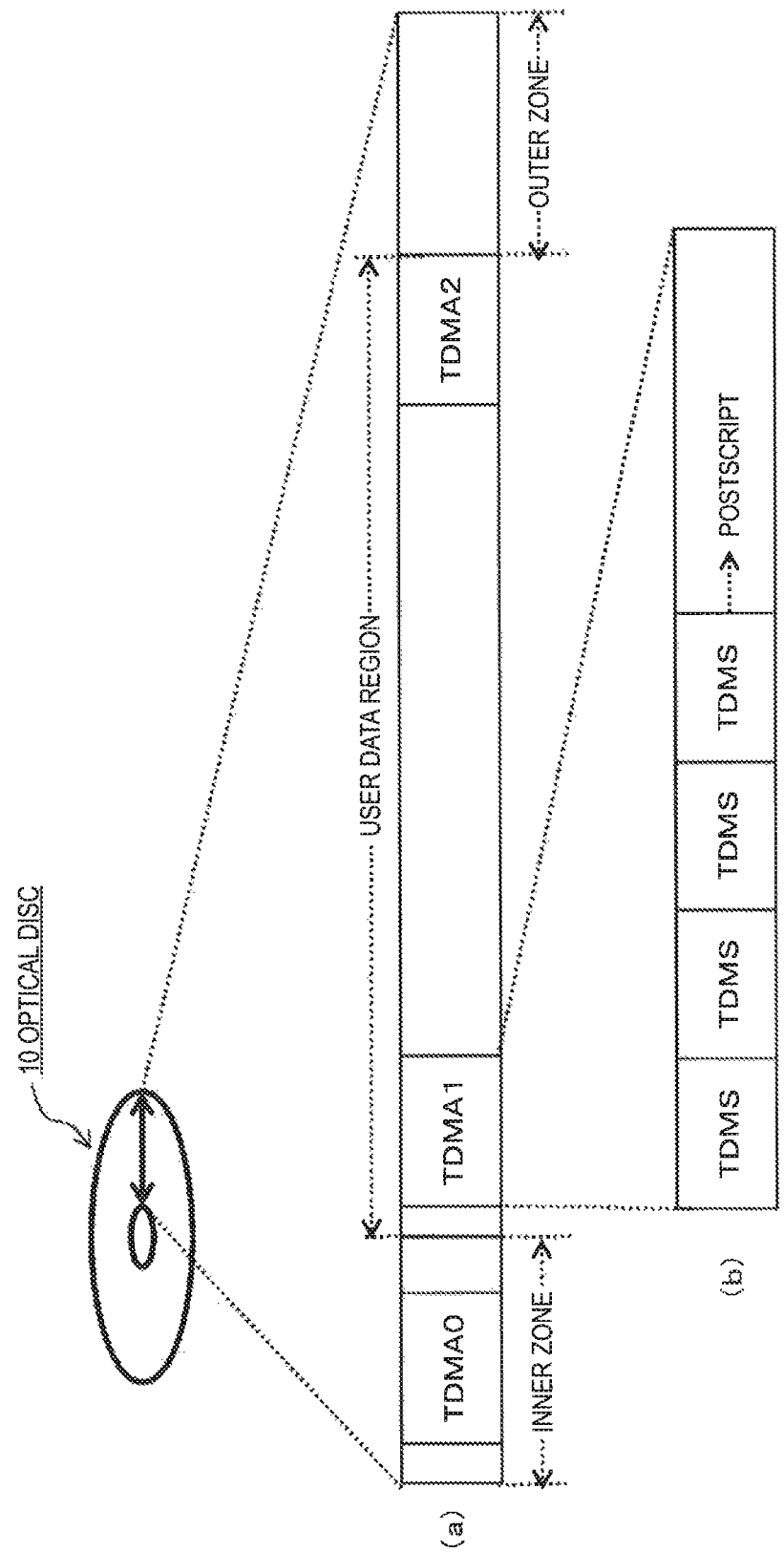
FIG. 1 is a diagram for describing an example of a data recording configuration of the optical disc.

FIG. 1 is a diagram illustrating a data recording configuration example of, for example, an optical disc 10 such as a Blu-ray (registered trademark) disc (BD).

(a) of FIG. 1 illustrates each data region set in the inner circumference to the outer circumference of the optical disc.

An inner zone at an inner circumference end or an outer zone at the outer circumference end is a recording region such as management information of the disc. For example, the inner zone or the outer zone is a recording region of a disc management area (DMA).

The disc management area (DMA) is last disc management information that is generated after a finalization process performed when the data recording of the disc is completed and it is confirmed that a postscript process is not performed after the data recording.

Before the finalization process is performed, that is, when additional recording of data on the disc is possible, a temporary disc management structure (TDMS) serving as temporary management information is recorded using a temporary disc management area (TDMA) which is a temporary management information area.

As illustrated in FIG. 1, a temporary disc management area (TDMA) can be set in any of various positions in an inner zone of an inner circumferential end, an outer zone of an outer circumferential end, and a user data region.

As illustrated in FIG. 1(*b*), the TDMS serving as temporary management information of data is additionally recorded in the TDMA as necessary. For example, whenever new data recording is performed on the optical disc 10, a new TDMS is additionally recorded as necessary.

Also, as described above, the TDMA and the TDMS are management data unique to a recordable optical disc.

In the TDMS, disc management information such as defect cluster information is recorded.

For example, information regarding the position of a defect cluster or an alternative cluster position is recorded.

When an information processing device on which the optical disc 10 is mounted performs a postscript process or a reproduction process for data, a correct data recording or reproduction process can be performed by reading a latest TDMS and referring to defect region information recorded in the TDMS.

However, so far, the TDMA which is a TDMS recording region has generally been recorded in surface units of a disc.

Figure 2:
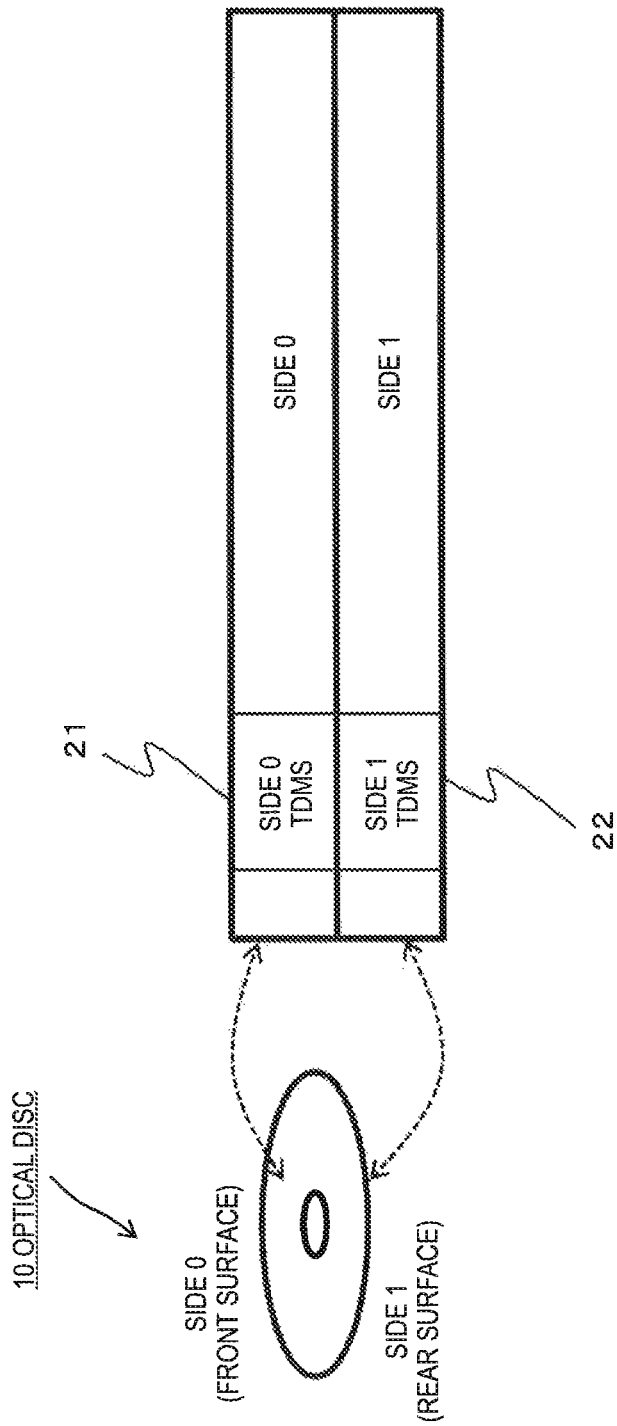
FIG. 2 is an explanatory diagram illustrating a recording example of management information regarding a double-sided disc.

That is, as illustrated in FIG. 2, when the disc is a double-sided disc that has recording layers on both front and rear surfaces of the disc, a TDMS corresponding to the front surface (side 0) and including defect information regarding the front surface (side 0) of the disc is recorded only on the front surface (side 0) of the disc. In addition, a TDMS corresponding to the rear surface (side 1) and including defect information regarding the rear surface (side 1) of the disc is recorded only on the rear surface (side 1) of the disc.

Figure 3:
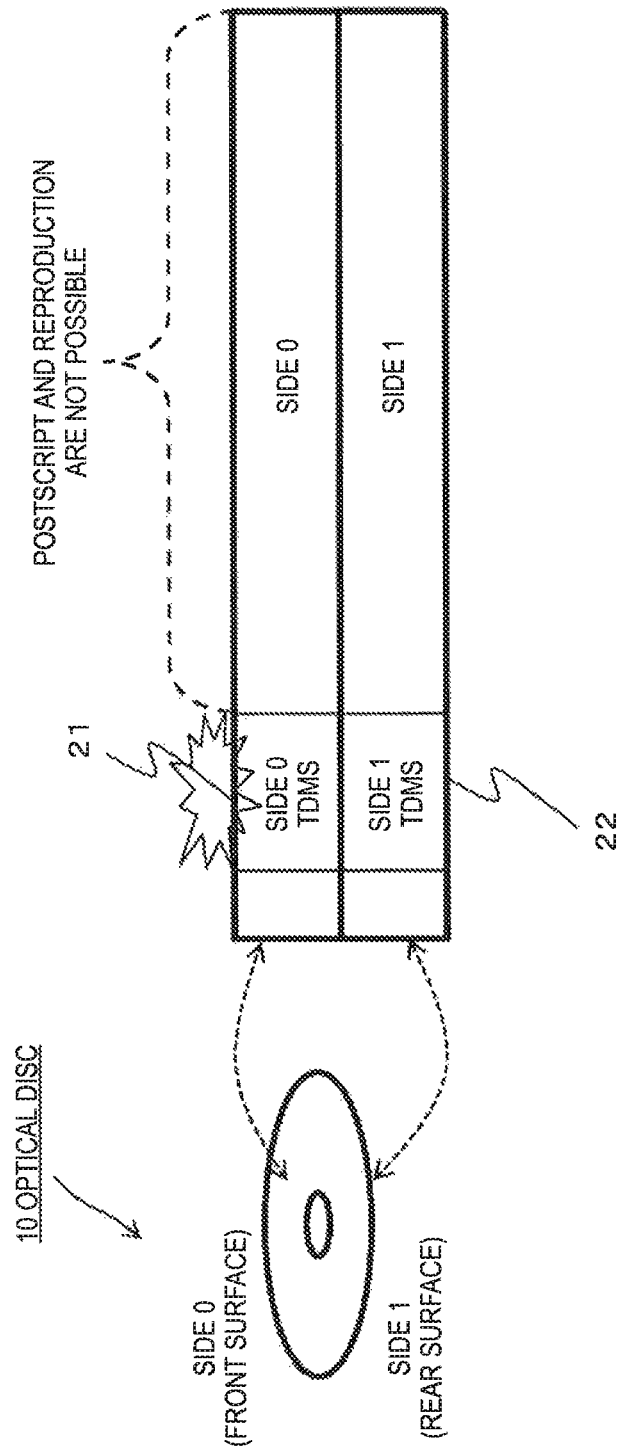
FIG. 3 is a diagram for describing a problem caused due to occurrence of a reading error of the management information.

Accordingly, for example, as illustrated in FIG. 3, when a TDMS on the front surface of the disc is not readable due to any cause, there is a possibility of defect information on the front surface not being obtainable and new data not being correctly recorded or reproduced on the front surface of the disc.

Figure 4:
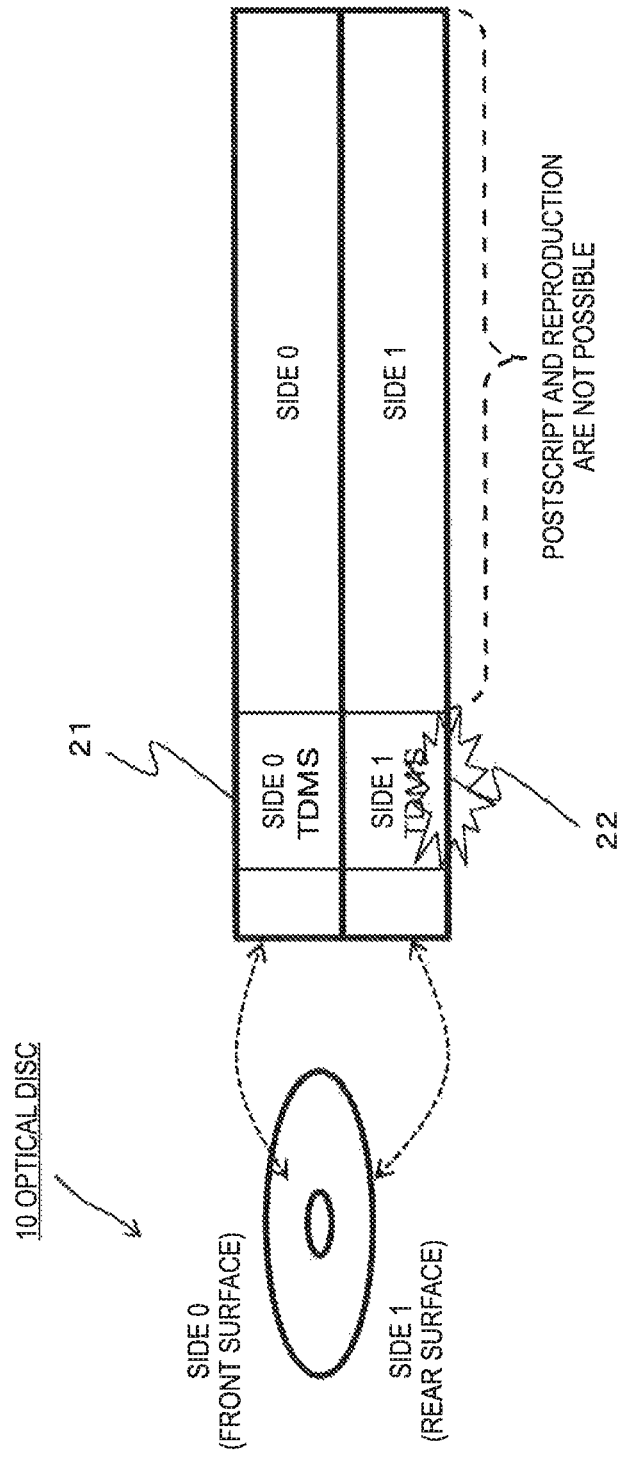
FIG. 4 is a diagram for describing a problem caused due to occurrence of a reading error of the management information.

Similarly, as illustrated in FIG. 4, when a TDMS on the rear surface of the disc is not readable due to any cause, there is a possibility of defect information on the rear surface not being obtainable and new data not being correctly recorded or reproduced on the rear surface of the disc.

That is, in the related art, a TDMS is not subjected to redundant recording and tray be a single point of failure.

[2. Recording Configuration of Improved Disc Management Information]

Next, a new recording configuration of disc management information for resolving the above-described problems will be described.

Figure 5:
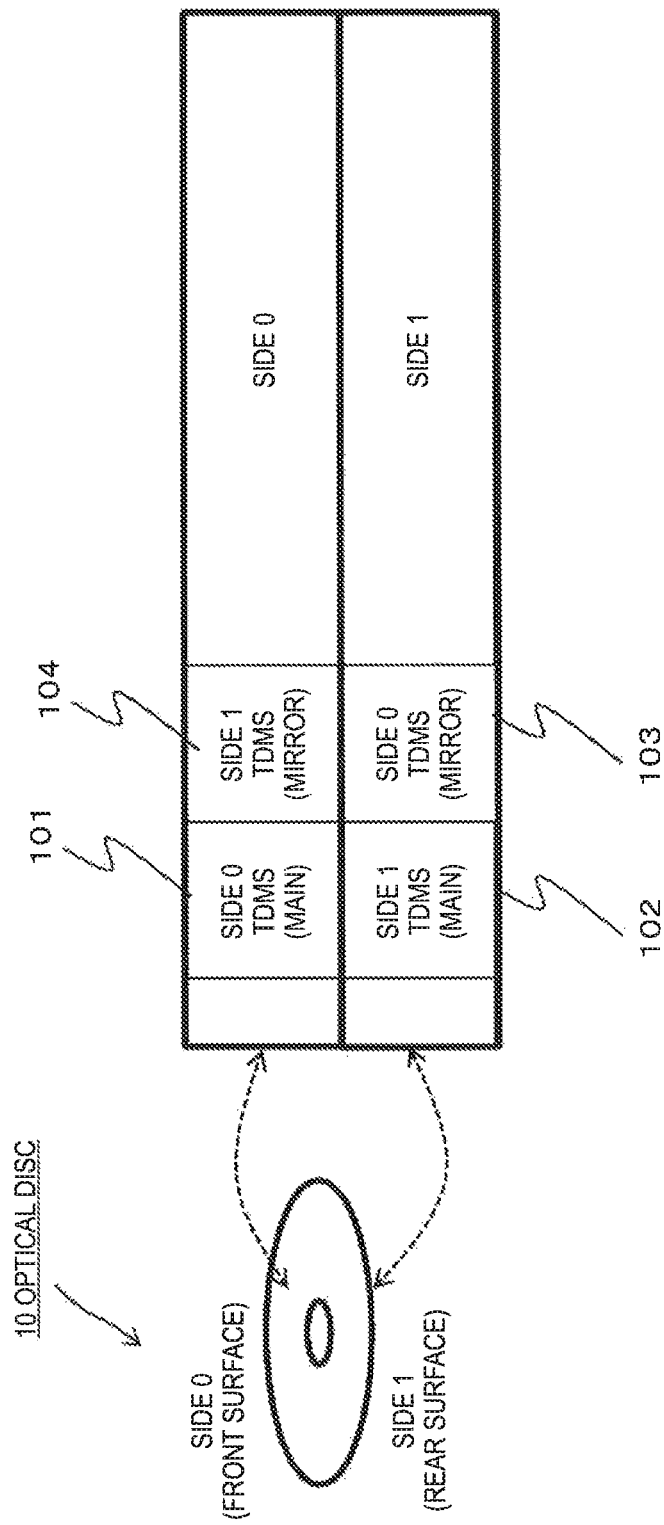
FIG. 5 is a diagram for describing a recording configuration example of improved management information.

FIG. 5 illustrates one embodiment of a recording configuration of disc management information according to the present disclosure.

FIG. 5 illustrates a recording configuration example of disc management information (TDMS) on a double-sided disc that has recording layers on both front and rear surfaces of the disc.

As illustrated in FIG. 5, the following TDMSs are recorded on the front surface (side 0) of the disc:
(a1) side 0 TDMS (main) 101; and
(a2) side 1 TDMS (mirror) 104.

On the other hand, the following TDMSs are recorded on the rear surface (side 1) of the disc:
(b1) side 1 TDMS (main) 102; and
(b2) side 0 TDMS (mirror) 103.

Also, as described above, the TDMA and the TDMS are management data. unique to a recordable optical disc. The configuration of the present disclosure to be described below is applied to a recordable optical disc.

The (a1) side 0 TDMS (main) 101 is a TDMS corresponding to the front surface (side 0) of the disc and including defect region information of the front surface (side 0) of the disc.

The same data of the "(a1) side 0 TDMS (main) 101" is recorded as the "(b2) side 0 TDMS (mirror) 103" of the rear surface (side 1) of the disc.

That is, the TDMS corresponding to the front surface (side 0) of the disc and including the defect region information of the front surface (side 0) of the disc is recorded doubly on the front and rear surfaces of the disc.

Similarly, the (b1) side 1 TDMS (main) 102 is a TDMS corresponding to the rear surface (side 1) of the disc and including defect region information of the rear surface (side 1) of the disc.

The same data of the "(b1) side 1 TDMS (main) 102" is recorded as the "(a2) side 1 TDMS (mirror) 104" of the front surface (side 0) of the disc.

That is, the TDMS corresponding to the rear surface (side 1) of the disc and including the defect region information of the rear surface (side 1) of the disc is recorded doubly on the front and rear surfaces of the disc.

In this way, by recording the TDMS corresponding to one surface of the disc doubly on the front and rear surfaces of the disc, it is possible to considerably reduce the possibility of occurrence of a recording or reproduction error caused due to a reading error of the TDMS.

For example, an example of a case in which the information processing device performs an additional data recording or reproduction process on the front surface (side 0) of the disc will be described with reference to FIG. 6.

The information processing device first starts reading the side 0 TDMS (main) 101 recorded on the front surface (side 0) of the disc. However, the side 0 TDMS (main) 101 is assumed not to be readable due to some cause.

In this case, the information processing device reads the side 0 TDMS (mirror) 103 recorded on the rear surface (side 1) of the disc. In the side 0 TDMS (mirror) 103, the same data of the side 0 TDMS (main) 101 recorded on the front surface (side 0) of the disc is recorded.

That is, the data is the TDMS corresponding to the front surface (side 0) of the disc and having defect region information of the front surface (side 0) of the disc.

The information processing device can acquire the defect region information of the front surface (side 0) of the disc with reference to the side 0 TDMS (mirror) 103 recorded on the rear surface (side 1) of the disc and perform a new data recording or data reproduction process by skipping a defect region of the front surface (side 0) of the disc.

On the other hand, an example of a case in which the information processing device performs an additional data recording or reproduction process on the rear surface (side 1) of the disc will be described with reference to FIG. 7.

The information processing device first starts reading the side 1 TDMS (main) 102 recorded on the rear surface (side 1) of the disc. However, the side 1 TDMS (main) 102 is assumed not to he readable due to some cause.

In this case, the information processing device reads the side 1 TDMS (mirror) 104 recorded on the front surface (side 0) of the disc. In the side 1 TDMS (mirror) 104, the same data of the side 1 TDMS (main) 102 recorded on the rear surface (side 1) of the disc is recorded.

That is, the data is the TDMS corresponding to the rear surface (side 1) of the disc and having defect region information of the rear surface (side 1) of the disc.

The information processing device can acquire the defect region information of the rear surface (side 1) of the disc with reference to the side 1 TDMS (mirror) 104 recorded on the front surface (side 0) of the disc and perform a new data recording or data reproduction process by skipping a defect region of the rear surface (side 1) of the disc.

Figure 6:
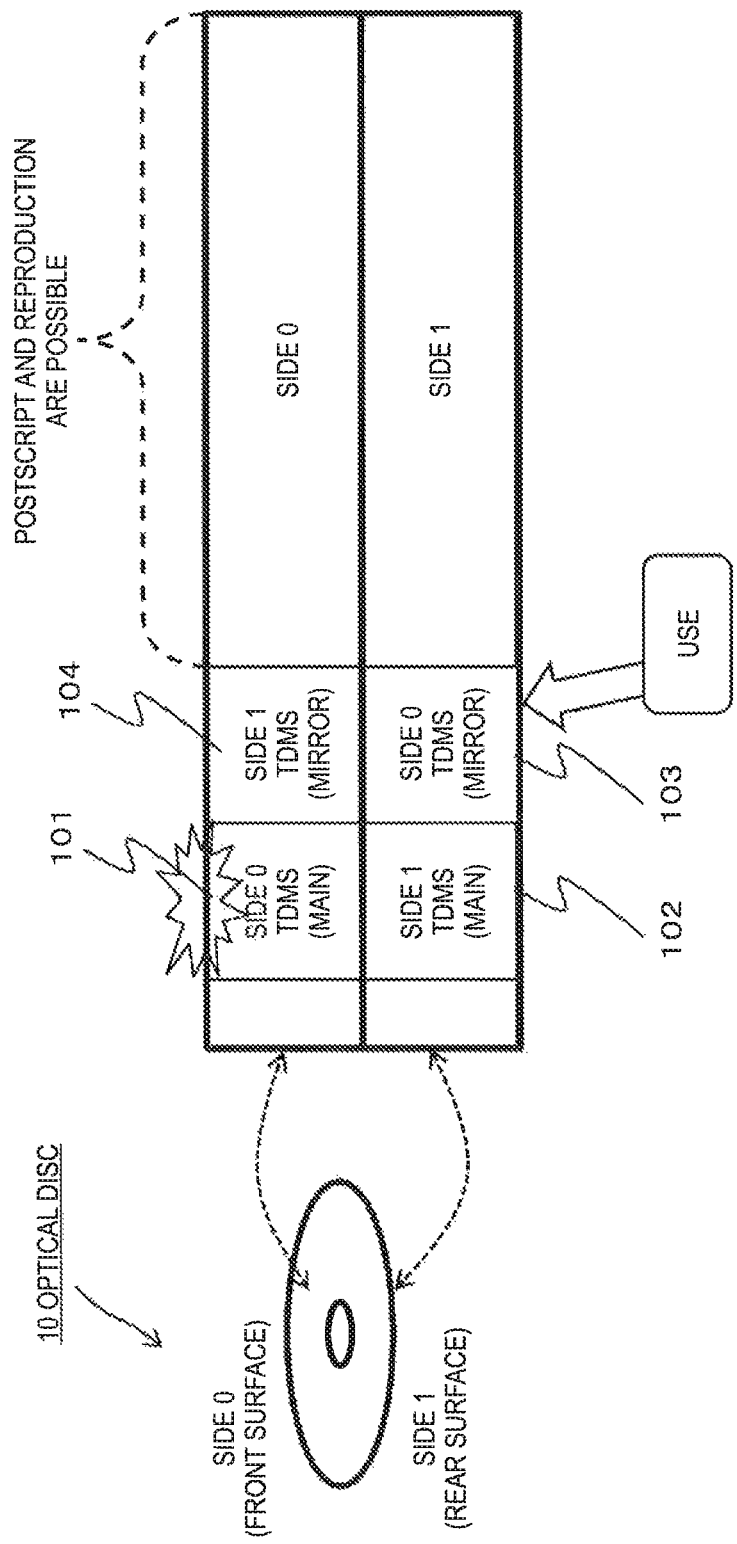
FIG. 6 is a diagram for describing a recording configuration example and a usage example of improved management information.
Figure 7:
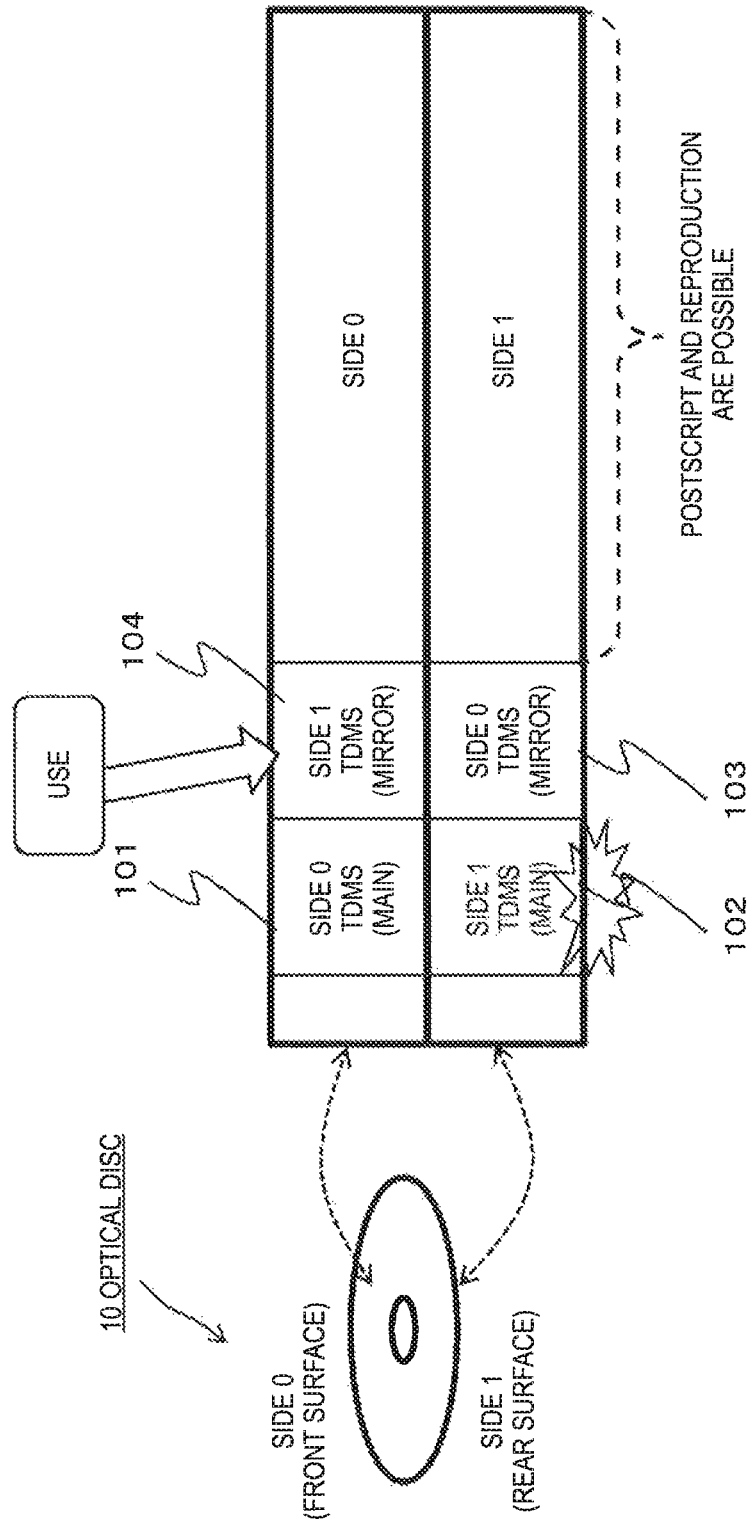
FIG. 7 is a diagram for describing a recording configuration example and a usage example of improved management information.

Also, the example described with reference to FIGS. 5 to 7 is a configuration example in which both the front surface (side 0) of the disc and the rear surface (side 1) of the disc have two 1-layered data recording layers. However, a disc having a plurality of recording layers on each of the front and rear surfaces of the disc can also have the same configuration.

Figure 8:
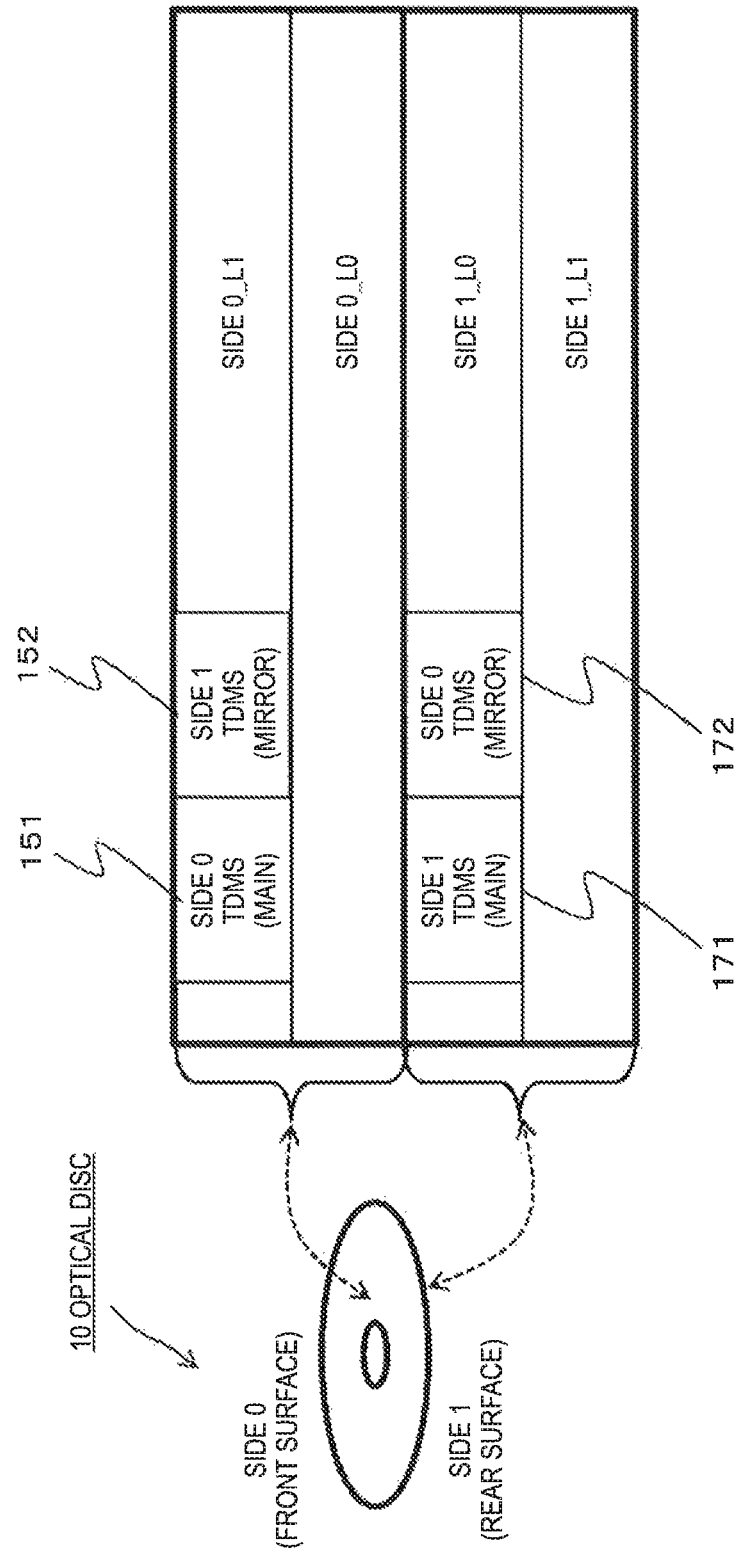
FIG. 8 is a diagram for describing a recording configuration example and a usage example of improved management information.

An example illustrated in FIG. 8 is a configuration example of a disc that has two 2-layered data recording layers, that is, 4-layered data recording layers, on the front surface (side 0) of the disc and the rear surface (side 1) of the disc. On the front surface (side 0) of the disc, the two recording layers (layers) are configured of:

layer 0 (side 0_L0); and layer 1 (side 0_L1).

On the other hand, on the rear surface (side 1) of the disc, the two recording layers (layers) are configured of:

layer 2 (side 1_L0); and layer 3 (side 1_ L1).

A total of four recording layers are included.

On such a multi-layered disc, the TDMS including defect region information is individually generated as management information corresponding to the front surface (side 0) of the disc and the rear surface (side 1) of the disc.

The TDMS on the front surface (side 0) of the disc is generated as a TDMS including defect region information regarding two layers on the front surface (side 0) of the disc, that is, the following two recording layers (layers):

layer 0 (side 0_L0); and layer 1 (side 0_L1).

On the other hand, the TDMS on the rear surface (side 1) of the disc is generated as a TDMS including defect region information regarding two layers on the rear surface (side 1) of the disc, that is, the following two recording layers (layers):

layer 2 (side 1_L0); and layer 3 (side 1_L1).

When the TDMS recording configuration according to the present disclosure is applied, each TDMS is recorded in the setting illustrated in FIG. 8.

As illustrated in FIG. 8, the following TDMSs are recorded on the front surface (side 0) of the disc:

(a1) side 0 TDMS (main) 151; and (a2) side 1 TDMS (mirror) 152.

On the other hand, the following TDMSs are recorded on the rear surface (side 1) of the disc:

(b1) side 1 laws (main) 171; and (b2) side 0 TDMS (mirror) 172.

The (a1) side 0 TDMS (main) 151 is a TDMS corresponding to the front surface (side 0) of the disc and including defect region information of two layers of the front surface (side 0) of the disc, that is, the following two recording layers (layers):

layer 0 (side 0_L0); and layer 1 (side 0_L1).

The same data of the "(a1) side 0 TDMS (main) 151" is recorded as the "(b2) side 0 TDMS (mirror) 172" of the rear surface (side 1) of the disc.

That is, the TDMS corresponding to the front surface (side 0) of the disc and including the defect region information of the front surface (side 0) of the disc is recorded doubly on the front and rear surfaces of the disc.

Similarly, the (b1) side 1 TDMS (main) 171 is a TDMS corresponding to the rear surface (side 1) of the disc and including defect region information of two layers of the rear surface (side 1) of the disc, that is, the following two recording layers (layers):

layer 2 (side 1_L0); and
layer 3 (side 1_L1).

The same data of the "(b1) side 1 TDMS (main) 171" is recorded as the "(a2) side 1 TDMS (mirror) 152" of the front surface (side 0) of the disc.

That is, the TDMS corresponding to the rear surface (side 1) of the disc and including the defect region information of the rear surface (side 1) of the disc is recorded doubly on the front and rear surfaces of the disc.

In this way, by recording the TDMS corresponding to one surface of the disc doubly on the front and rear surfaces of the disc, it is possible to considerably reduce the possibility of occurrence of a recording or reproduction error caused due to a reading error of the TDMS.

[3. Detailed Configuration and Specific Recording Example of TDMS]

Next, a detailed configuration and a specific recording example of the TDMS will be described with reference to FIG. 9 and the subsequent drawings.

Figure 9:
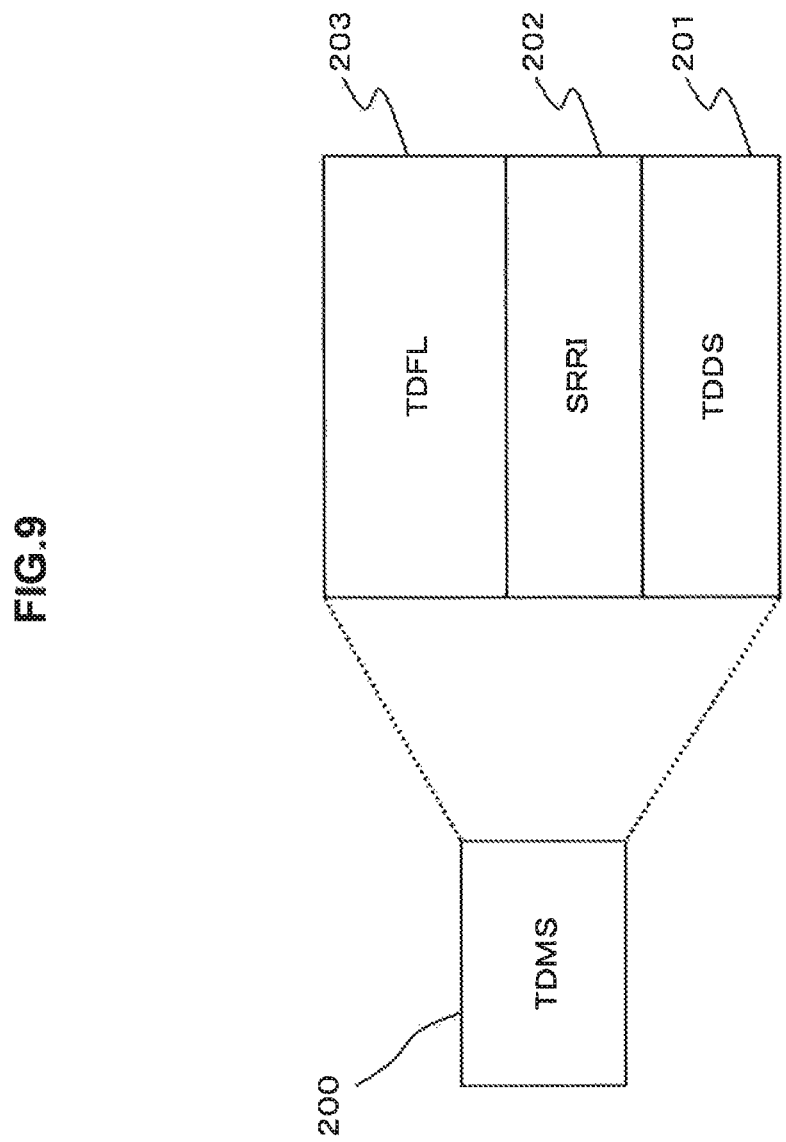
FIG. 9 is a diagram for describing a detailed configuration example of a TDMS.

As illustrated in FIG. 9, the TDMS is configured to include the following three components:

(a) a temporary disc definition structure (TDDS) 201;
(b) sequential recording range information (SRRI) 202 and
(c) a temporary defect list (TDFL) 203.

The TDMS is configured to include the foregoing three components.

Information regarding management of the TDMS is mainly recorded in the TDDS 201.

The SRRI 202 is management information of consecutive recording range information (a sequential recording range (SRR)) of user data recorded in a user data region.

Information such as defect cluster region information or alternative cluster region information (a DOW entry and a DFL entry) is recorded in the TDFL 203.

When the TDMS is referred to, the information processing device first reads the TDDS, extracts link information as recording positions of the TDFL and the SRRI from the TDDS, and reads recording data of the TDFL and the SRRI.

In the configuration according to the present disclosure, as described above with reference to FIGS. 5 to 8, the TDMSs of both the front and rear surfaces of the disc are doubly recorded on both the front and rear surfaces of the disc.

That is, the TDMSs of both the front and rear surfaces of the disc are recorded on the front surface of the disc and the same TDMSs of both the front and rear surfaces of the disc are also recorded on the rear surface of the disc.

A specific recording configuration example of the TDMS will be described with reference to FIG. 10 and the subsequent drawings.

The following three TDMS recording aspects will be described sequentially:

(A) a configuration in which two TDMSs are recorded in one cluster;
(B) a configuration in which one TDMS is recorded in one cluster; and
(C) a configuration in which one TDMS is recorded using a plurality of clusters.

[3-(A). Configuration in Which Two TDMSs are Recorded in One Cluster]

First, a configuration example in which two TDMSs are recorded in one cluster will be described with reference to FIG. 10.

Figure 10:
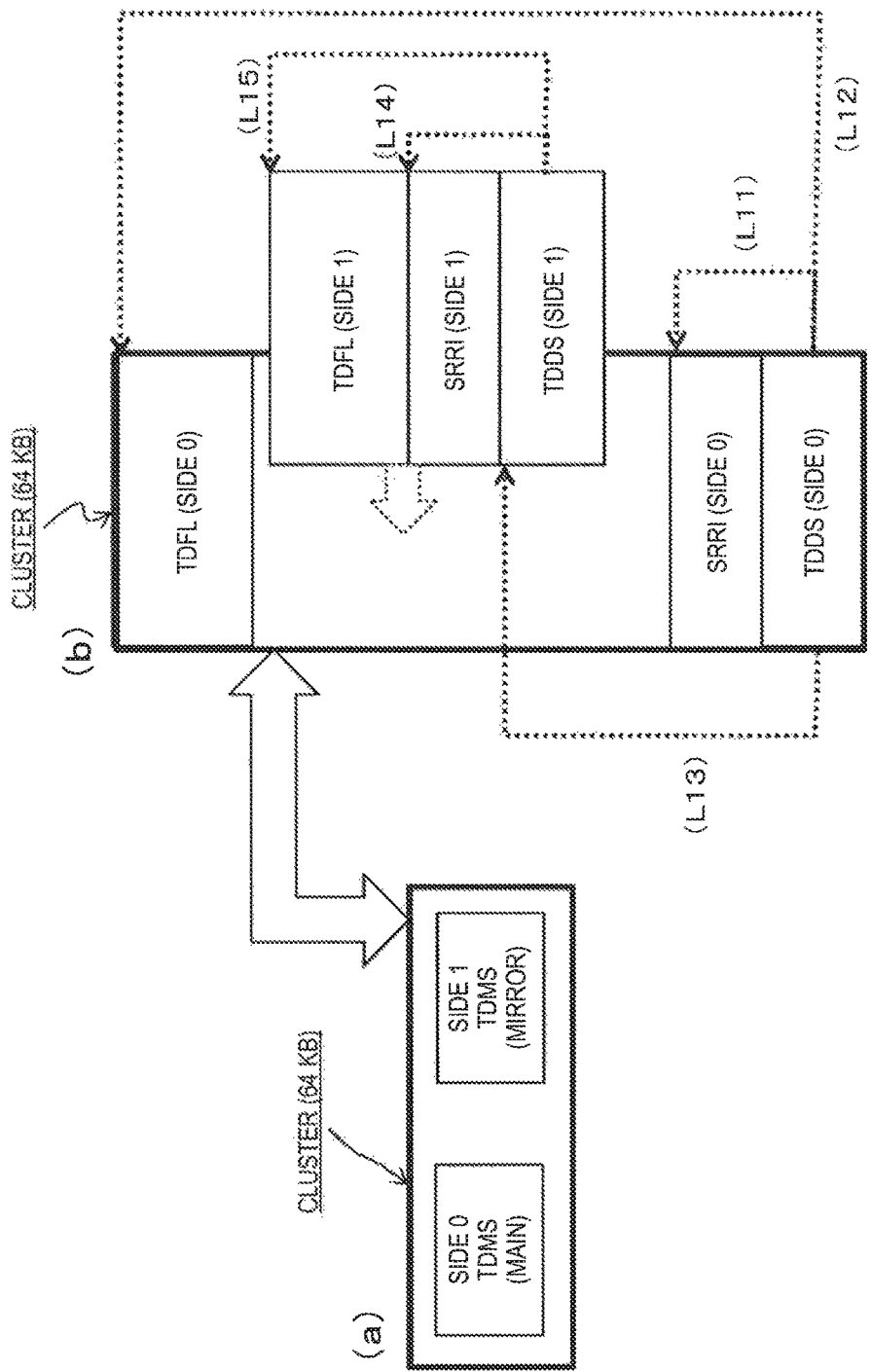
FIG. 10 is a diagram for describing a detailed recording configuration example and a link example of the TDMS.

FIG. 10 illustrates an example in which the TDMS (main) of the front surface (side 0) of the disc and the TDMS (mirror) of the rear surface (side 1) of the disc are recorded inside one cluster (64 KB) which is a data recording unit on the disc.

Also, this example is a TDMS recording example on the front surface (side 0) of the disc.

Also, a data amount of one TDMS considerably differs in accordance with the number of defect clusters or the like recorded inside the TDMS, Two TDMSs may not necessarily be recorded in one cluster (64 KB), as illustrated in FIG. 10(*a*).

An example of a case in which the TDMSs may not be recorded in one cluster will be described with reference to FIG. 11 and the subsequent drawings.

FIG. 10(*a*) is a diagram illustrating an example in which the TDMS (main) of the front surface (side 0) of the disc and the TDMS (mirror) of the rear surface (side 1) of the disc are recorded in one cluster (64 KB).

FIG. 10(*b*) is a diagram illustrating a link relation between two pieces of TDMS configuration data recorded inside one cluster.

L11 to L15 indicate a link relation between the pieces of configuration data.

It is indicated that link data serving as access information (reading position) of data at an ending point of an arrow is recorded inside data at a start point of the arrow. Specifically, for example, a physical sector number (PSN: physical sector address) of the head of each piece of configuration data is recorded.

When a process of reading the cluster (64 KB) in which two TDMSs are recorded is performed, data recorded in the head of a cluster, that is, the TDDS (side ) of the side 0 TDMS (main) of the front surface of the disc, is first read.

The following link information is recorded in the TDDS (side 0):

(1) link information (L11): access information of the SRRI (side 0) of the side 0 TDMS (main);
(2) link information (L12): access information of the TDFL (side 0) of the side 0 TDMS (main); and
(3) link information (L13): access information of the TDDS (side 1) of the side 1 TDMS (mirror).

The information processing device can read the data recorded in the head of the cluster, that is, the TDDS (side 0) of the side 0 TDMS (main) of the front surface (side 0) of the disc., and obtain data access destination information of the foregoing (1) to (3) by referring to the data.

For example, when TDMS information of the rear surface (side 1) of the disc is desired to be read, the information processing device reads the data recorded in the head of the cluster, that is, the TDDS (side 0) of the side 0 TDMS (main) of the front surface (side 0) of the disc, and acquires the link information of the foregoing (3). That is, the information processing device acquires the following link information and reads the TDDS (side 1) of the side 1 TDMS (mirror):

(3) link information (L13): access information of the TDDS (side 1) of the side 1 TDMS (mirror).

The following link information is recorded in the TDDS (side 1) of the side 1 TDMS (mirror):

(4) link information (L14): access information of the SRRI (side 1) of the side 1 TDMS (mirror); and (5) link information (L15): access information of the TDFL (side 1) of the side 1 TDMS (mirror).

The information processing device can obtain all the information of the TDMS (mirror) of the rear side (side 1) of the disc using the link information.

[3-(B). Configuration in Which One TDMS is Recorded in one Cluster]

Next, a configuration example in which one TDMS is recorded in one cluster will be described with reference to FIG. 11.

Figure 11:
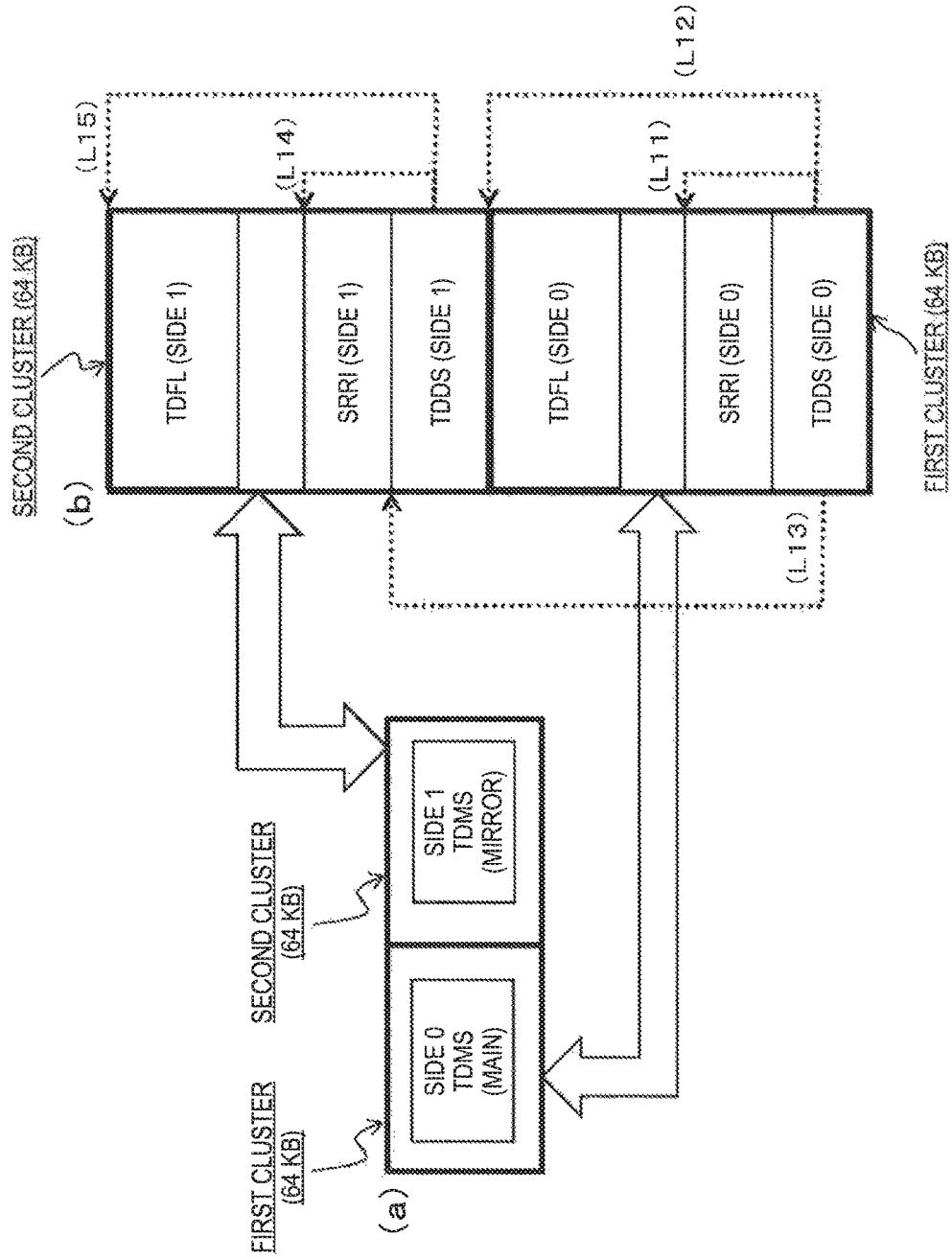
FIG. 11 is a diagram for describing a detailed recording configuration example and a link example of the TDMS.

FIG. 11 illustrates an example in which the TDMS (main) of the front surface (side 0) of the disc is recorded inside a first cluster (64 KB) which is one cluster which is a data recording unit on the disc and the TDMS (mirror) of the rear surface (side 1) of the disc is recorded inside a second cluster (64 KB) which is another cluster.

Also, this example is a TDMS recording example on the front surface (side 0) of the disc.

FIG. 11(a) illustrates the first and second clusters as two clusters (64 KB). The TDMS (main) of the front surface (side 0) of the disc and the TDMS (mirror) of the rear surface (side 1) of the disc are separately recorded in the clusters.

FIG. 11(b) is a diagram illustrating a link relation between two pieces of TDMS configuration data recorded inside two clusters.

L11 to L15 indicate a link relation between the pieces of configuration data.

It is indicated that link data serving as access information (reading position) of data at an ending point of an arrow is recorded inside data at a start point of the arrow. Specifically, for example, a physical sector number (PSN: physical sector address) of the head of each piece of configuration data is recorded.

When a process of reading two consecutive clusters (64 KB) in which two TDMSs are recorded is performed, data reading is performed from the head of the first cluster in which the TDMS (main) of the front surface (side 0) of the disc is first recorded. That is, the TDDS (side 0) of the side 0 TDMS (main) of the front surface (side 0) of the disc is read.

The following link information is recorded in the TDDS (side 0):

(1) link information (L11): access information of the SRRI (side 0) of the side 0 TDMS (main);

(2) link information (L12): access information of the TDFL (side 0) of the side 0 TDMS (main); and (3) link information (L13): access information of the TDDS (side 1) of the side 1 TDMS (mirror) recorded in the second cluster.

The information processing device can read the data recorded in the head of the first cluster, that is, the TDDS (side 0) of the side 0 TDMS (main) of the front surface (side 0) of the disc, and obtain data access destination information of the foregoing (1) to (3) by referring to the data.

For example, when TDMS information of the rear surface (side 1) of the disc is desired to be read, the information processing device reads the data recorded in the head of the first cluster, that is, the TDDS (side 0) of the side 0 TDMS (main) of the front surface (side 0) of the disc, and acquires the link information of the foregoing (3). That is, the information processing device acquires the following link information and reads the TDDS (side 1) of the side 1 TDMS (mirror) recorded in the second cluster:

(3) link information (L13): access information of the TDDS (side 1) of the side 1 TDMS (mirror) recorded in the second cluster.

The following link information is recorded in the TDDS (side 1) of the side 1 TDMS (mirror) recorded in the second cluster:

(4) link information (L14): access information of the SRRI (side 1) of the side 1 TDMS (mirror); and (5) link information (L15): access information of the TDFL (side 1) of the side 1 TDMS (mirror).

The information processing device can obtain all the information of the TDMS (mirror) of the rear side (side 1) of the disc using the link information.

[3-(C). Configuration in which one TDMS is Recorded Using a Plurality of Clusters]

Next, a configuration example in which one TDMS is recorded using a plurality of clusters will be described with reference to FIG. 12.

Figure 12:
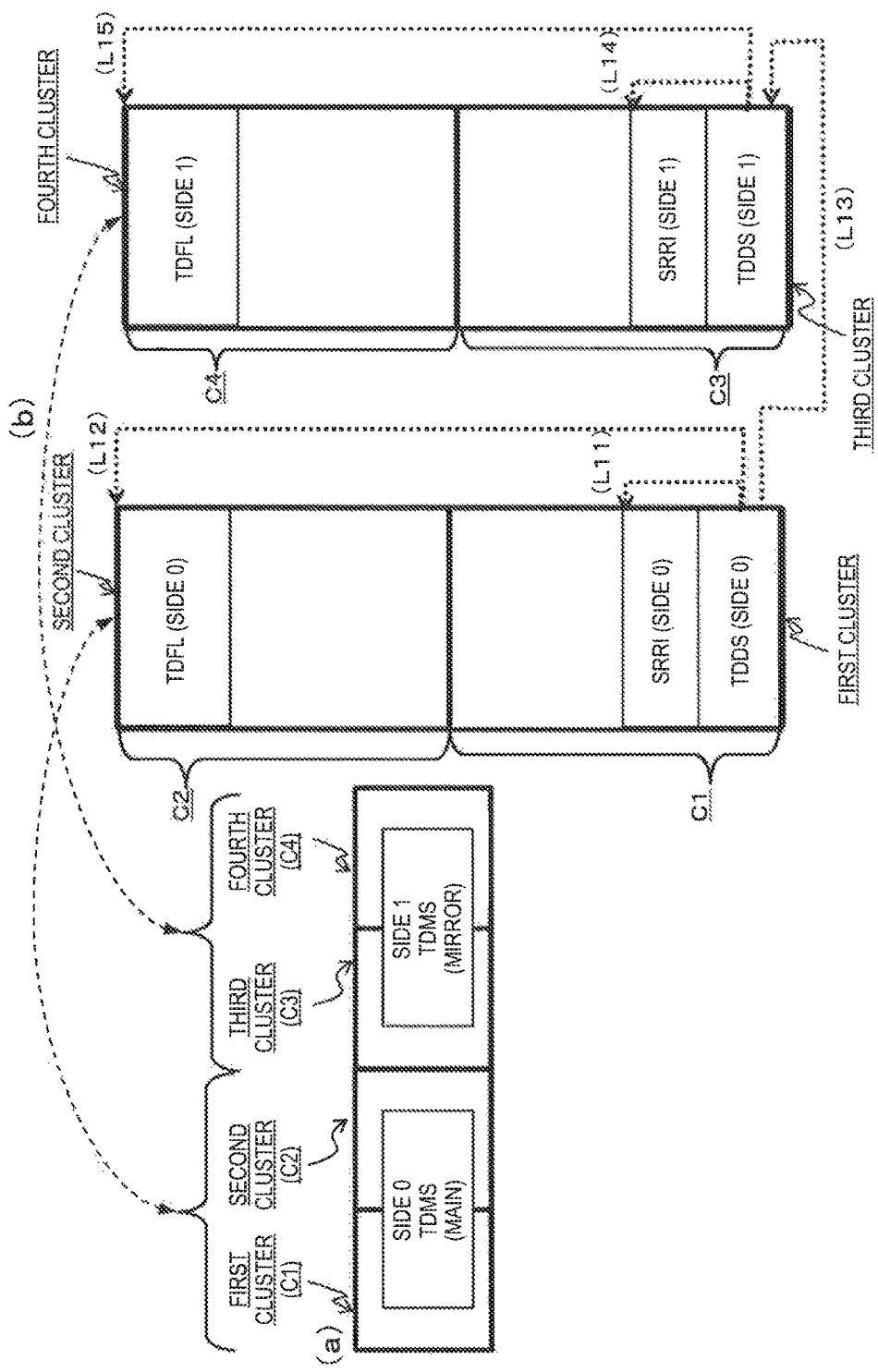
FIG. 12 is a diagram for describing a detailed recording configuration example and a link example of the TDMS.

FIG. 12 illustrates an example in which one TDMS is recorded using two clusters which are a data recording unit on the disc.

That is, an example in which the TDMS (main) of the front surface (side 0) of the disc is recorded in the first and second clusters and the TDMS (mirror) of the rear surface (side 1) of the disc is further recorded in third and fourth clusters is illustrated.

Also, this example is a TDMS recording example on the front surface (side 0) of the disc.

FIG. 12(a) illustrates four clusters, that is, the first to fourth clusters. The TDMS (main) of the front surface (side 0) of the disc is recorded in the first and second clusters and the TDMS (mirror) of the rear surface (side 1) of the disc is separately recorded in the third and fourth clusters.

FIG. 12(b) is a diagram illustrating a link relation between two pieces of TDMS configuration data recorded inside four clusters.

L11 to L15 indicate a link relation between the pieces of configuration data.

It is indicated that link data serving as access information (reading position) of data at an ending point of an arrow is recorded inside data at a start point of the arrow. Specifically, for example, a physical sector number (PSN: physical sector address) of the head of each piece of configuration data is recorded.

When a process of reading four consecutive clusters (64 KB) in which two TDMSs are recorded is performed, data reading is first performed from the head of the first cluster in which the TDMS (main) of the front surface (side 0) of the disc is recorded. That is, the TDDS (side 0) of the side 0 TDMS (main) of the front surface (side 0) of the disc is read.

The following link information is recorded in the TDDS (side 0):

(1) link information (L11): access information of the SRRI (side 0) of the side 0 TDMS (main);

(2) link information (L12): access information of the TINT (side 0) of the side 0 TDMS (main); and (3) link information (L13): access information of the TDDS (side 1) of the side 1 TDMS (mirror) recorded in the third cluster.

The information processing device can read the data recorded in the head of the first cluster, that is, the TDDS (side 0) of the side 0 TDMS (main) of the front surface (side 0) of the disc, and obtain data access destination information of the foregoing (1) to (3) by referring to the data.

For example, when TDMS information of the rear surface (side 1) of the disc is desired to be read, the information processing device reads the data recorded in the head of the first cluster, that is, the TDDS (side 0) of the side 0 TDMS (main) of the front surface (side 0) of the disc, and acquires the link information of the foregoing (3). That is, the information processing device acquires the following link information and reads the TDDS (side 1) of the side 1 TDMS (mirror) recorded in the third cluster:

(3) link information (L13): access information of the TDDS (side 1) of the side 1 TDMS (mirror) recorded in the third cluster.

The following link information is recorded in the TDDS (side 1) of the side 1 TDMS (mirror) recorded in the third cluster:

(4) link information (L14): access information of the SRRI (side 1) of the side 1 TDMS (mirror); and (5) link information (L15): access information of the TDFL (side 1) of the side 1 TDMS (mirror).

The information processing device can obtain all the information of the TDMS (mirror) of the rear side (side 1) of the disc using the link information.

[4. Process Sequence Performed by Information Processing Device]

Next, sequences of processes performed by the information processing device will be described with reference to the flowcharts illustrated in FIGS. 13 and 14.

First, a sequence of a data recording process on the disc in the information processing device will be described with reference to the flowchart illustrated in FIG. 13.

Also, for example, processes in the flow illustrated in FIG. 13 are performed under the control of a data processing unit that includes a CPU having a program execution function of the information processing device. A program is stored in a storage unit of the information processing device.

The processes of steps of the flowchart illustrated in FIG. 13 will be described sequentially.

(Step S101)

First, in step S101, the information processing device performs a data recording process on a first surface of the disc. Also, the first surface is one surface between the front surface (side 0) of the disc and the rear surface (side 1) of the disc.

(Step S102)

Next, in step S102, the information processing device performs a process of recording the main TDMS corresponding to the first surface on the first surface on which the data recording process is performed in step S101. That is, a new TDMS including information updated through a new data recording process is additionally recorded in a TDMA region.

(Step S103)

Next, in step S103, the information processing device performs a process of recording the mirror TDMS corresponding to the first surface and having the same content as the main TDMS corresponding to the first surface and recorded on the first surface in step S102 on a second surface different from the first surface.

In this way, the same TDMS is doubly recorded on the first and second surfaces.

Next, a sequence of a data reproduction process from the disc in the information processing device will be described with reference to the flowchart illustrated in FIG. 14.

Also, for example, processes in the flow illustrated in FIG. 14 are performed under the control of a data processing unit that includes a CPU having a program execution function of the information processing device. A program is stored in a storage unit of the information processing device.

The processes of steps of the flowchart illustrated in FIG. 14 will be described sequentially.

(Step S201)

First, in step S201, the information processing device reads the main TDMS corresponding to the first surface from the first surface of a data reproduction target.

Also, the first surface is one surface between the front surface (side 0) of the disc and the rear surface (side 1) of the disc.

(Step S202)

Next, in step S202, the information processing device determines whether the process of reading the main TDMS corresponding to the first surface is successfully performed in step S201.

When the reading is successful, the process proceeds to step S204.

When the reading fails, the process proceeds to step S203.

(Step S203)

When a failure of the process of reading he main TDMS corresponding to the first surface is confirmed, the information processing device performs the process of step S203.

In step S203, the mirror TDMS corresponding to the first surface and having the same content as the main TDMS corresponding to the first surface is read from the second surface different from the first surface of the data reproduction target.

(Step S204)

In step S204, the information processing device starts the data reproduction process from the first surface with reference to recording information of the read TDMS corresponding to the first surface.

Also, the TDMS corresponding to the first surface used in the information processing device is one TDMS between the main TDMS corresponding to the first surface and read from the first surface in step S201 and the mirror TDMS corresponding to the first surface and read from the second surface in step S203.

Either TDMS is also a latest TDMS corresponding to the first surface which is a reproduction target. The information processing device can correctly recognize a defect cluster or alternative cluster position with reference to the one TDMS and can perform a correct reproduction process without an error.

[5. Example Configuration of Information Processing Device]

Next, with reference to FIG. 15, an example configuration of an information processing device that executes each of the above-described processing will be described.

A central processing unit (CPU) 301 functions as a data processing unit that executes various processes according to a program stored in read-only memory (ROM) 302 or a storage unit 308. For example, processes described in the embodiment described above are executed. Random access memory (RAM) 303 stores information such as programs executed by the CPU 301, and data. The CPU 301, ROM 302, and RAM 303 are interconnected by a bus 304.

The CPU 301 is connected to an input/output interface 305 via the bus 304. Connected to the input/output interface 305 are an input unit 306, which includes devices such as various switches, a keyboard, a mouse, and a microphone, and an output unit 307, which includes devices such as a display and one or more speakers. The CPU 301 executes various processes in response to commands input from the input unit 306, and outputs processing results to the output unit 307, for example.

A storage unit 308 connected to the input/output interface 305 includes a hard disk or the like, for example, and stores programs executed by the CPU 301 and various data. A communication unit 309 functions as a transceiving unit for data communication via a network such as the Internet or a local area network, additionally functions as a transceiving unit for broadcast waves, and communicates with external devices.

The drive 310 connected to the input/output interface 305 drives a recording media 311 such as a disc on which data recording is performed according to the above-described embodiments to write or read data.

[6. Summary of Configuration of Present Disclosure]

The foregoing thus provides a detailed explanation of embodiments of the present disclosure with reference to specific embodiments, However, it is obvious that persons skilled in the art may make modifications and substitutions to these embodiments without departing from the gist of the present disclosure, in other words, the present disclosure has been disclosed by way of example, and should not be interpreted in a limited manner. The gist of the present disclosure should be determined in consideration of the claims.

Additionally, the present technology may also be configured as below.

(1)
An information processing device including:
a data processing unit configured to record management information regarding a disc,
in which the data processing unit
records management information corresponding to a first surface as main management information on the first surface which is a data recording surface on which data recording is performed and
further performs a process of recording mirror management information having the same content as the main management information on a second surface which is different from the first surface which is a data recording surface on which the data recording is performed.

(2)
The information processing device according to (1),
in which the management information is a temporary disc management structure (TDMS) including defect region information of one surface of the disc.

(3)
The information processing device according to (2),
in which the TDMS includes:
(a) a temporary disc definition structure (TDDS);
(b) sequential recording range information (SRRI); and
(c) a temporary defect list (TDFL)
as configuration data.

(4)
The information processing device according to (3),
in which the data processing unit generates and records a TDMS including link information among the configuration data of the TDMS.

(5)
The information processing device according to any of (1) to (4),
in which the data processing unit records two TDMSs of both surfaces of the disc in one cluster.

(6)
The information processing device according to any of (1) to (4),
in which the data processing unit records a TDMS of one surface of the disc in one cluster.

(7)
The information processing device according to any of (1) to (4),
in which the data processing unit records a TDMS of one surface of the disc in a plurality of clusters.

(8)
The information processing device according to any of (1) to (7),
in which the disc is a recordable optical disc.

(9)
An information processing device including:
a data processing unit configured to perform a data reproduction process from a disc,
in which the data processing unit
performs a process of reading main management information which is management information corresponding to a first surface from the first surface which is a data recording surface serving as a data reproduction target,
performs a process of reading mirror management information having the same content as the main management information from a second surface different from the first surface when a reading error of the main management information occurs, and
performs the data reproduction process from the first surface with reference to any of the main management information and the mirror management information.

(10)
The information processing device according to (9),
in which the management information is a temporary disc management structure (TDMS) including defect region information of one surface of the disc.

(11)
The information processing device according to (10),
in which the TDMS includes:
(a) a temporary disc definition structure (TDDS);
(b) sequential recording range information (SRRI); and
(c) a temporary defect list (TDFL)
as configuration data.

(12)
The information processing device according to (11),
in which the data processing unit reads the configuration data of the TDMS with reference to link information among the configuration data of the TDMS.

(13)
The information processing device according to any of (9) to (12),
in which the disc is a recordable optical disc.

(14)
A disc type information recording medium on which user data and management information are recorded,
in which the management information is individual management information corresponding to each surface of a disc,
first surface management information corresponding to a first surface is recorded as main management information on the first surface, and
mirror management information having the same content as the main management information is recorded on a second surface different from the first surface.

(15)
The information recording medium according to (14),
in which the management information is a temporary disc management structure (TDMS) including defect region information of one surface of the disc.

(16)

The information recording medium according to (15), in which the TDMS includes:
(a) a temporary disc definition structure (TDDS);
(b) sequential recording range information (SRRI); and
(c) a temporary defect list (TDFL)
as configuration data.

(17)

An information processing method of performing data recording control on a disc in an information processing device,
in which the information processing device includes a data processing unit configured to record management information regarding the disc, and
the data processing unit
records management information corresponding to a first surface as main management information on the first surface which is a data recording surface on which data recording is performed and
further performs a process of recording mirror management information having the same content as the main management information on a second surface which is different from the first surface which is a data recording surface on which the data recording is performed.

(18)

An information processing method of performing data reproduction control from a disc in an information processing device,
in which the information processing device includes a data processing unit configured to perform a data reproduction process from the disc, and
the data processing unit
performs a process of reading main management information which is management information corresponding to a first surface from the first surface which is a data recording surface serving as a data reproduction target,
performs a process of reading mirror management information having the same content as the main management information from a second surface different from the first surface when a reading error of the main management information occurs, and
performs the data reproduction process from the first surface with reference to any of the main management information and the mirror management information.

(19)

A program causing data recording control to be performed on a disc in an information processing device,
in which the information processing device includes a data processing unit configured to record management information regarding the disc, and
the program causes the data processing unit to perform
a process of recording management information corresponding to a first surface as main management information on the first surface which is a data recording surface on which data recording is performed and
a process of recording mirror management information having the same content as the main management information on a second surface which is different from the first surface which is a data recording surface on which the data recording is performed.

(20)

A program causing data reproduction control from a disc to be performed an information processing device,
in which the information processing device includes a data processing unit configured to perform the data reproduction process from the disc, and
the program causes the data processing unit to perform
a process of reading main management information which is management information corresponding to a first surface from the first surface which is a data recording surface serving as a data reproduction target,
a process of reading mirror management information having the same content as the main management information from a second surface different from the first surface when a reading error of the main management information occurs, and
the data reproduction process from the first surface with reference to any of the main management information and the mirror management information.

In addition, it is possible to execute the processes described in this specification in hardware, in software, or in a compound configuration of both. In the case of executing processes in software, a program stating a processing sequence may be installed onto memory in a computer built into special-purpose hardware and executed, or alternatively, the program may be installed and executed on a general-purpose computer capable of executing various processes. For example, the program may be prerecorded onto a recording medium. Besides installing the program onto a computer from a recording medium, the program may also be received via a network such as a local area network (LAN) or the Internet, and installed onto a built-in recording medium such as a hard disk.

Note that the various processes described in the specification not only may be executed in a time series in the order described, but may also be executed in parallel or individually according to the processing performance of the device executing the process, or as needed. Also, in this specification, the term "system" refers to a logical aggregate configuration of multiple devices, and the respective devices of the configuration are not limited to being inside the same housing,

INDUSTRIAL APPLICABILITY

As described above, according to a configuration of an embodiment of the present disclosure, a configuration for reducing a possibility of data recording or reproduction being unperformable due to a reading error of disc management information is realized.

Specifically, the data processing unit of an information processing device which performs data recording and reproduction on a disc records management information corresponding to a first surface as main management information on the first surface which is a data recording surface on which data recording is performed and further performs a process of recording mirror management information having the same content as the main management information on a second surface different from the first surface. The management information is, for example, a temporary disc management structure (TDMS) including defect region information of one surface of a disc. When one piece of management information between the main management information and the mirror management information is successfully read, data recording or reproduction can be correctly performed.

In this configuration, it is possible to reduce the possibility of the data recording or reproduction being unperformable due to a reading error of the disc management information.

REFERENCE SIGNS LIST

10 optical disc
21 side 0 TDMS 22 side 1 TDMS
101 side 0 TDMS (main)
102 side 1 TDMS (main)
103 side 0 TDMS (mirror)
104 side 1 TDMS (mirror)
151 side 0 TDMS (main)
152 side 1 TDMS (mirror)
171 side 1 TDMS (main)
172 side 0 TDMS (mirror)
200 TDMS
201 TDDS
202 SRRI
203 TDFL
301 CPU
302 ROM
303 RAM
304 BUS
305 input/output interface
306 input unit
307 output unit
308 storage unit
309 communication unit
310 drive
311 recording media

The invention claimed is:

1. An information processing device comprising:
a data processing unit configured to record management information regarding a disc,
wherein the data processing unit
records management information corresponding to a first surface of the disc as first main management information on the first surface which is a data recording surface on which data recording is performed,
further performs a process of recording first mirror management information having the same content as the first main management information on a second surface of the disc which is different from the first surface,
records management information corresponding to the second surface as second main management information on the second surface which is a data recording surface on which data recording is performed, and
further performs a process of recording second mirror management information having the same content as the second main management information on the first surface,
wherein the first main management information is recorded before the second mirror management information on the first surface of the disc,
wherein the second main management information is recorded before the first mirror management information on the second surface of the disc, and
wherein the data processing unit is implemented via at least one processor.

2. The information processing device according to claim 1,
wherein the management information comprises a temporary disc management structure (TDMS) including defect region information of one surface of the disc.

3. The information processing device according to claim 2,
wherein the TDMS includes:
(a) a temporary disc definition structure (TDDS);
(b) sequential recording range information (SRRI); and
(c) a temporary defect list (TDFL)
as configuration data.

4. The information processing device according to claim 3,
wherein the data processing unit generates and records a TDMS including link information among the configuration data of the TDMS.

5. The information processing device according to claim 1,
wherein, on the first surface, the data processing unit records two TDMSs corresponding to the first main management information and the second mirror management information in one cluster, and
wherein, on the second surface, the data processing unit records two TDMSs corresponding to the second main management information and the first mirror management information in one cluster.

6. The information processing device according to claim 1,
wherein the data processing unit records a TDMS of one surface of the disc in one cluster.

7. The information processing device according to claim 1,
wherein the data processing unit records a TDMS of one surface of the disc in a plurality of clusters.

8. The information processing device according to claim 1,
wherein the disc is a recordable optical disc.

9. An information processing device comprising:
a data processing unit configured to perform a data reproduction process from a disc,
wherein the data processing unit
performs a process of reading first main management information which is management information corresponding to a first surface of the disc from the first surface which is a data recording surface serving as a data reproduction target,
performs a process of reading first mirror management information having the same content as the first main management information from a second surface of the disc different from the first surface when a reading error of the first main management information occurs,
performs the data reproduction process from the first surface with reference to any of the first main management information or the first mirror management information,
performs a process of reading second main management information which is management information corresponding to the second surface from the second surface which is a data recording surface serving as a data reproduction target,
performs a process of reading second mirror management information having the same content as the second main management information from the first surface when a reading error of the second main management information occurs, and
performs the data reproduction process from the second surface with reference to any of the second main management information or the second mirror management information,
wherein the first main management information is recorded before the second mirror management information on the first surface of the disc,
wherein the second main management information is recorded before the first mirror management information on the second surface of the disc, and wherein the data processing unit is implemented via at least one processor.

10. The information processing device according to claim 9,
wherein the management information comprises a temporary disc management structure (TDMS) including defect region information of one surface of the disc.

11. The information processing device according to claim 10,
wherein the TDMS includes:
(a) a temporary disc definition structure (TDDS);
(b) sequential recording range information (SRRI); and
(c) a temporary defect list (TDFL)
as configuration data.

12. The information processing device according to claim 11,
wherein the data processing unit reads the configuration data of the TDMS with reference to link information among the configuration data of the TDMS.

13. The information processing device according to claim 9,
wherein the disc is a recordable optical disc.

14. A disc type information recording medium on which user data and management information are recorded,
wherein the management information is individual management information corresponding to each surface of a disc,
wherein first surface management information corresponding to a first surface of the disc is recorded as first main management information on the first surface,
wherein first mirror management information having the same content as the first main management information is recorded on a second surface of the disc different from the first surface,
wherein second surface management information corresponding to the second surface is recorded as second main management information on the second surface,
wherein second mirror management information having the same content as the second main management information is recorded on the first surface,
wherein the first surface management information is recorded before the second mirror management information on the first surface of the disc, and
wherein the second surface management information is recorded before the first mirror management information on the second surface of the disc.

15. The information recording medium according to claim 14,
wherein the management information comprises a temporary disc management structure (TDMS) including defect region information of one surface of the disc.

16. The information recording medium according to claim 15,
wherein the TDMS includes:
(a) a temporary disc definition structure (TDDS);
(b) sequential recording range information (SRRI); and
(c) a temporary defect list (TDFL)
as configuration data.

17. An information processing method of performing data recording control on a disc in an information processing device,
wherein the information processing device includes a data processing unit configured to record management information regarding the disc,
wherein the data processing unit
records management information corresponding to a first surface of the disc as first main management information on the first surface which is a data recording surface on which data recording is performed,
further performs a process of recording first mirror management information having the same content as the first main management information on a second surface of the disc which is different from the first surface,
records management information corresponding to the second surface as second main management information on the second surface which is a data recording surface on which data recording is performed, and
further performs a process of recording second mirror management information having the same content as the second main management information on the first surface,
wherein the first main management information is recorded before the second mirror management information on the first surface of the disc, and
wherein the second main management information is recorded before the first mirror management information on the second surface of the disc.

18. An information processing method of performing data reproduction control from a disc in an information processing device,
wherein the information processing device includes a data processing unit configured to perform a data reproduction process from the disc,
wherein the data processing unit
performs a process of reading first main management information which is management information corresponding to a first surface of the disc from the first surface which is a data recording surface serving as a data reproduction target,
performs a process of reading first mirror management information having the same content as the first main management information from a second surface of the disc different from the first surface when a reading error of the first main management information occurs,
performs the data reproduction process from the first surface with reference to any of the first main management information or the first mirror management information,
performs a process of reading second main management information which is management information corresponding to the second surface of the disc from the second surface which is a data recording surface serving as a data reproduction target,
performs a process of reading second mirror management information having the same content as the second main management information from the first surface when a reading error of the second main management information occurs, and
performs the data reproduction process from the second surface with reference to any of the second main management information or the second mirror management information,
wherein the first main management information is recorded before the second mirror management information on the first surface of the disc, and
wherein the second main management information is recorded before the first mirror management information on the second surface of the disc.

19. A non-transitory computer-readable storage medium having embodied thereon program, which when executed by an information processing device causes the information processing device to execute a method, the method comprising:

causing data recording control to be performed on a disc in the information processing device;

recording management information regarding the disc;

performing a process of recording management information corresponding to a first surface of the disc as first main management information on the first surface which is a data recording surface on which data recording is performed;

performing a process of recording first mirror management information having the same content as the first main management information on a second surface of the disc which is different from the first surface;

performing a process of recording management information corresponding to the second surface as second main management information on the second surface which is a data recording surface on which data recording is performed; and performing a process of recording second mirror management information having the same content as the second main management information on the first surface, wherein the first main management information is recorded before the second mirror management information on the first surface of the disc, and wherein the second main management information is recorded before the first mirror management information on the second surface of the disc.

20. A non-transitory computer-readable storage medium having embodied thereon program, which when executed by an information processing device causes the information processing device to execute a method, the method comprising:

causing data reproduction control from a disc to be performed in the information processing device;

performing a data reproduction process from the disc;

performing a process of reading first main management information which is management information corresponding to a first surface of the disc from the first surface which is a data recording surface serving as a data reproduction target;

performing a process of reading first mirror management information having the same content as the first main management information from a second surface of the disc different from the first surface when a reading error of the first main management information occurs;

performing the data reproduction process from the first surface with reference to any of the first main management information or the first mirror management information;

performing a process of reading second main management information which is management information corresponding to the second surface from the second surface which is a data recording surface serving as a data reproduction target, performs a process of reading second mirror management information having the same content as the second main management information from the first surface when a reading error of the second main management information occurs, and performs the data reproduction process from the second surface with reference to any of the second main management information or the second mirror management information, wherein the first main management information is recorded before the second mirror management information on the first surface of the disc, and wherein the second main management information is recorded before the first mirror management information on the second surface of the disc.

21. The information processing device according to claim 1, wherein the first main management information includes link information to the second mirror management information, and wherein the second main management information includes link information to the first mirror management information.

* * * * *